(12) United States Patent
Hiura et al.

(10) Patent No.: US 11,578,759 B2
(45) Date of Patent: Feb. 14, 2023

(54) SHAFT RETAINING RING AND IMAGE FORMING APPARATUS

(71) Applicant: CANON KABUSHIKI KAISHA, Tokyo (JP)

(72) Inventors: Hiroshi Hiura, Kashiwa (JP); Yoshimasu Yamaguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 291 days.

(21) Appl. No.: 16/818,434

(22) Filed: Mar. 13, 2020

(65) Prior Publication Data
US 2020/0217369 A1  Jul. 9, 2020

Related U.S. Application Data

(63) Continuation of application No. PCT/JP2018/034943, filed on Sep. 14, 2018.

(30) Foreign Application Priority Data

Sep. 15, 2017  (JP) .............. JP2017-178078

(51) Int. Cl.
*B65H 5/06* (2006.01)
*F16C 35/063* (2006.01)
*G03G 15/00* (2006.01)

(52) U.S. Cl.
CPC .............. *F16C 35/063* (2013.01); *B65H 5/06* (2013.01); *G03G 15/6529* (2013.01); *B65H 2404/17* (2013.01); *F16C 2326/58* (2013.01)

(58) Field of Classification Search
CPC ...... F16C 35/07; F16C 35/063; F16C 33/605; B65H 2407/17
See application file for complete search history.

(56) References Cited

U.S. PATENT DOCUMENTS

| 8,838,009 B2* | 9/2014 | Tamura | G03G 15/6529 |
| | | | 399/388 |
| 9,599,171 B2* | 3/2017 | Yamaguchi | F16D 43/202 |
| 2008/0199116 A1 | 8/2008 | Tamura et al. | 384/419 |
| 2015/0219134 A1 | 8/2015 | Yamaguchi | |

(Continued)

FOREIGN PATENT DOCUMENTS

| CN | 201623565 U | * 11/2010 |
| CN | 205803900 U | * 12/2016 |
| DE | 1400767 | 12/1968 |

(Continued)

OTHER PUBLICATIONS

Wurzel (Year: 1956).*

(Continued)

*Primary Examiner* — Howard J Sanders
(74) *Attorney, Agent, or Firm* — Venable LLP

(57) ABSTRACT

A retaining ring 1 for a shaft 2a usable with a bearing 3 having an outer ring 3a and an inner ring 3b fixed on the shaft, wherein the inner ring 3b and the outer ring 3a are rotatable relative to each other, and the retaining ring 1 is provided on the shaft 2a adjacent to the bearing 3 in a thrust direction to restrict a position of the bearing 3 in the thrust direction, the retaining ring 1 includes a protrusion 1a protruding in the thrust direction from a surface opposing the inner ring 3b in the thrust direction to contact the inner ring 3b so that the retaining ring 1 is out of contact from the outer ring 3a.

16 Claims, 14 Drawing Sheets

(56) References Cited

U.S. PATENT DOCUMENTS

2021/0200124 A1\* 7/2021 Watanabe .......... G03G 15/2017

FOREIGN PATENT DOCUMENTS

| GB | 752758 | | | 7/1956 | |
|---|---|---|---|---|---|
| GB | 752758 | A | \* | 7/1956 | |
| JP | S52-89539 | U | | 10/1975 | |
| JP | S52-89539 | U | | 7/1977 | |
| JP | H05-19640 | A | | 1/1993 | |
| JP | 2006-153172 | | | 6/2006 | |
| JP | 2006-153172 | A | | 6/2006 | |
| JP | 2006153172 | A | \* | 6/2006 | ............. F16C 43/04 |
| JP | 2007-198399 | | | 8/2007 | |
| JP | 2008-201150 | | | 9/2008 | |
| JP | 2008-201510 | A | | 9/2008 | |
| JP | 2013-151221 | | | 8/2013 | |
| JP | 2016-173112 | | | 9/2016 | |
| JP | 2016-173112 | A | | 9/2016 | |

OTHER PUBLICATIONS

International Search Report dated Oct. 23, 2018 in International Application No. PCT/JP2018/034943.
Office Action dated Oct. 5, 2021 in counterpart Japanese Application No. 2017-178078, together with English translation thereof.
Office Action dated Dec. 21, 2021 in counterpart Japanese Application No. 2017-178078, together with English translation thereof.
Extended European Search Report dated Apr. 26, 2021 in counterpart EP Application No. 18855702.9.
Office Action dated Feb. 1, 2021 in counterpart Chinese Application No. 201880059441.5, together with English translation thereof.

\* cited by examiner

SHAFT RETAINING RING AND IMAGE FORMING APPARATUS

CROSS-REFERENCE TO RELATED APPLICATIONS

This application is a continuation of International Patent Application No. PCT/JP2018/034943 filed Sep. 14, 2018, which claims the benefit of Japanese Patent Application No. 2017-178078 filed Sep. 15, 2017. The foregoing applications are incorporated herein be reference in their entireties.

TECHNICAL FIELD

The present invention relates to a retaining ring for a shaft mounted on a shaft for positioning and preventing a bearing mounted on the shaft. The present invention also relates to an image forming apparatus such as an electrophotographic copying machine, an electrophotographic printer, and an ink jet printer having the shaft retaining ring.

BACKGROUND ART

Conventionally, there has been known a technique in which a shaft retaining ring such as an E-ring (E-shaped retaining ring) is mounted to an annular groove formed on a shaft to suppress displacement or disengagement of a bearing in a thrust direction relative to the shaft.

Here, in the case that the shaft retaining ring contacts both an inner ring and a outer ring of the bearing, when the inner ring of the bearing and the retaining ring for the shaft rotate integrally, and the outer ring of the bearing and the retaining ring for the shaft rub against each other. This results in various problems such as rubbing noise, heat production, production of abrasion powder, and increase in required rotational load.

On the other hand, Japanese Utility Model Laid-Open Hei 5-19640 discloses a structure in which a gap is provided by a spacer such as a washer or a collar so that the outer ring of the bearing does not contact the retaining ring for the shaft.

In addition, instead of using standard bearings with the same width in the thrust direction between the inner ring and the outer ring, there is a technique in which an wide inner ring bearing having an inner ring wider than the outer ring is used, thus keeping the outer ring of the bearing and the retaining ring for the shaft out of contact with each other to suppress the displacement and the disengagement of the bearing in the thrust direction.

SUMMARY OF THE INVENTION

Problem to be Solved by the Invention

However, in the structure disclosed in Japanese Utility Model Laid-Open Hei 5-19640, it is necessary to mount the spacer at the time of assembling the product, and there is a liability that an increase in the number of parts leads to an increase in cost.

In addition, the wide inner ring bearing is more expensive than the standard bearing, and therefore, there is a likelihood that the use of the wide inner ring bearing leads to an increase in cost.

Accordingly, the present invention has been made in view of such a situation, and an object of the present invention is to provide a shaft retaining ring capable of suppressing contact between the outer ring of the bearing and the shaft retaining ring with an inexpensive structure.

Solution to Problem

A typical structure of the shaft retaining ring according to the present invention is a retaining ring for a shaft usable with a bearing having an outer ring and an inner ring fixed on the shaft, wherein the inner ring and the outer ring are rotatable relative to each other, and said retaining ring is provided on the shaft adjacent to said bearing in a thrust direction to restrict a position of said bearing in the thrust direction, said retaining ring comprising a protrusion protruding in the thrust direction from a surface opposing the inner ring in the thrust direction to contact the inner ring so that said retaining ring is out of contact from the outer ring.

Effect of the Invention

According to the present invention, it is possible to provide a shaft retaining ring that can suppress contact between the outer ring of the bearing and the shaft retaining ring with the inexpensive structure.

DESCRIPTION OF THE EMBODIMENTS

First Embodiment

<Image Forming Apparatus>

An overall structure of an image forming apparatus including a shaft retaining ring according to a first embodiment of the present invention will be described with reference to the drawings together with an operation at the time of image formation. Dimensions, materials, shapes, relative arrangements, and the like of components which will be described are not intended to limit the scope of the present invention to them unless otherwise specified.

Figure 1:
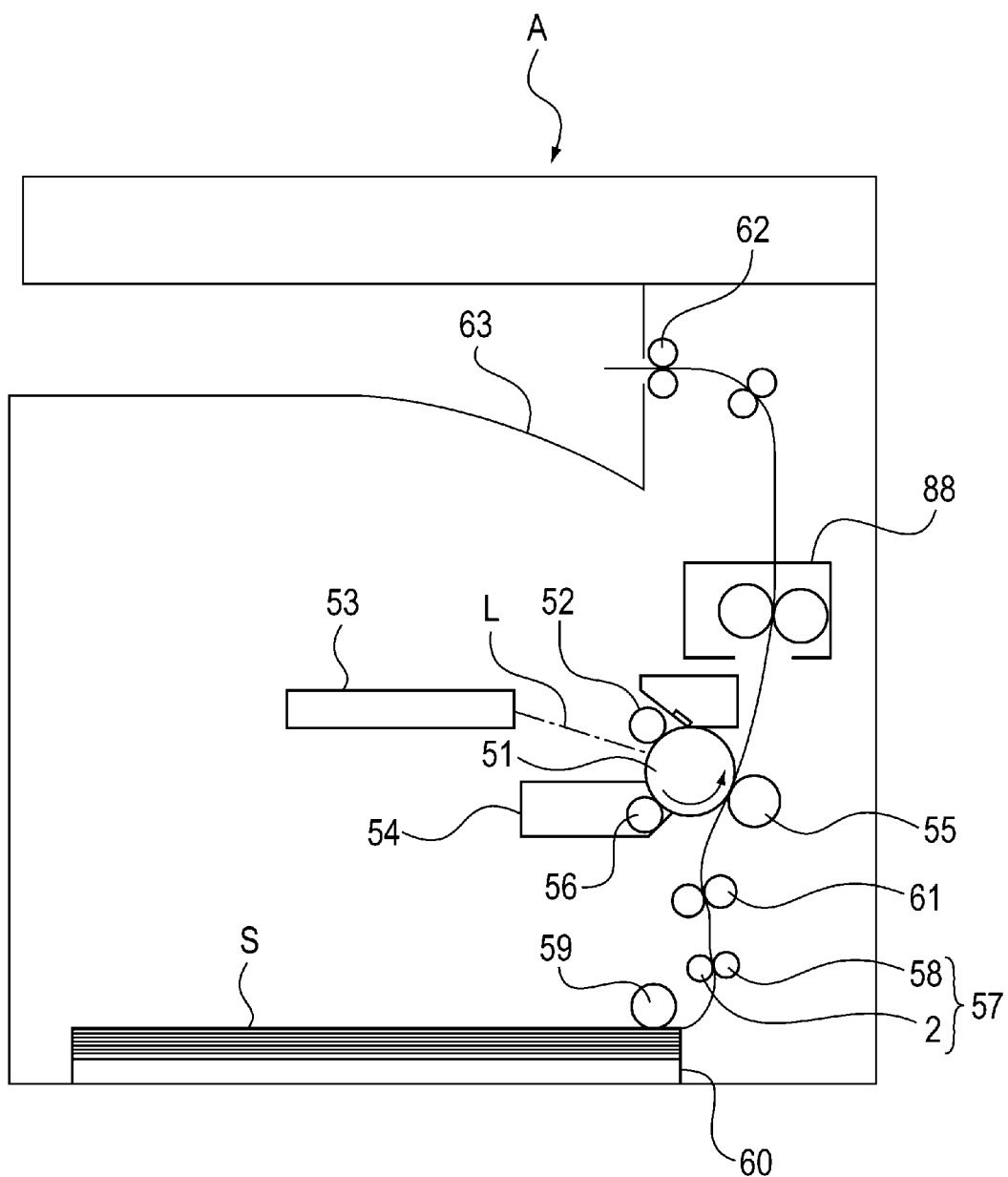
FIG. 1 is a schematic sectional view of an image forming apparatus.

As shown in FIG. 1, an image forming apparatus A includes an image forming portion which transfers a toner image to a sheet S (recording medium) to form an image, a sheet feeding portion for supplying the sheet S to the image forming portion, and a fixing portion for fixing the toner image on the sheet S.

The image forming portion includes a photosensitive drum 51, a charging roller 52, a developing device 54, a transfer roller 55, a laser scanner unit 53, and so on.

The sheet feeding portion includes a sheet feeding roller 59, a pair of transport rollers 57, and a pair of registration rollers 61. The transport roller pair 57 includes a transport roller 2 (rotary member) and a transport roller 58. The transport roller 58 is provided in pressure contact with the transport roller 2, and they form a transport nip for nipping and transporting the sheet S therebetween.

At the time of image forming operation, when a control portion (not shown) outputs a print signal, the sheet S stacked and stored in the sheet stacking portion 60 is first fed out to the registration roller pair 61 by the feed roller 59 and the transport roller pair 57. Then, the registration roller pair 61 feeds the sheet S to the image forming portion in synchronization with the operation of the image forming portion.

On the other hand, in the image forming portion, the surface of the photosensitive drum 51 is charged by applying a bias to the charging roller 52. Thereafter, a laser scanner unit 53 emits a laser beam L from a light source (not shown), and irradiates the photoconductor drum 51 with the laser beam L in accordance with image information. By this operation, the potential of the photosensitive drum 51 is partially lowered, so that an electrostatic latent image corresponding to the image information is formed on the surface of the photosensitive drum 51.

Subsequently, a bias voltage is applied to a developing sleeve 56 of the developing device 54, by which the toner is deposited from the developing sleeve 56 onto the electrostatic latent image formed on the surface of the photosensitive drum 51, thereby forming a toner image.

Next, the toner image formed on the surface of the photoconductor drum 51 is carried to a transfer nip formed between the photoconductor drum 51 and the transfer roller 55. When the toner image arrives at the transfer nip portion, a bias voltage having a polarity opposite to the polarity of the charged toner is applied to the transfer roller 55, so that the toner image is transferred onto the sheet S.

Thereafter, the sheet S onto which the toner image has been transferred is fed to a fixing device 88, and the toner image is heated and pressed by the fixing device 88 to be fixed on the sheet S. Thereafter, the sheet S is fed by a pair of discharge rollers 62 and is discharged to a discharge portion 63.

<Bearing Portion>

Next, the structure of a bearing portion which supports the shaft 2a which is a rotation shaft for the transport roller 2 will be described.

Figure 2:
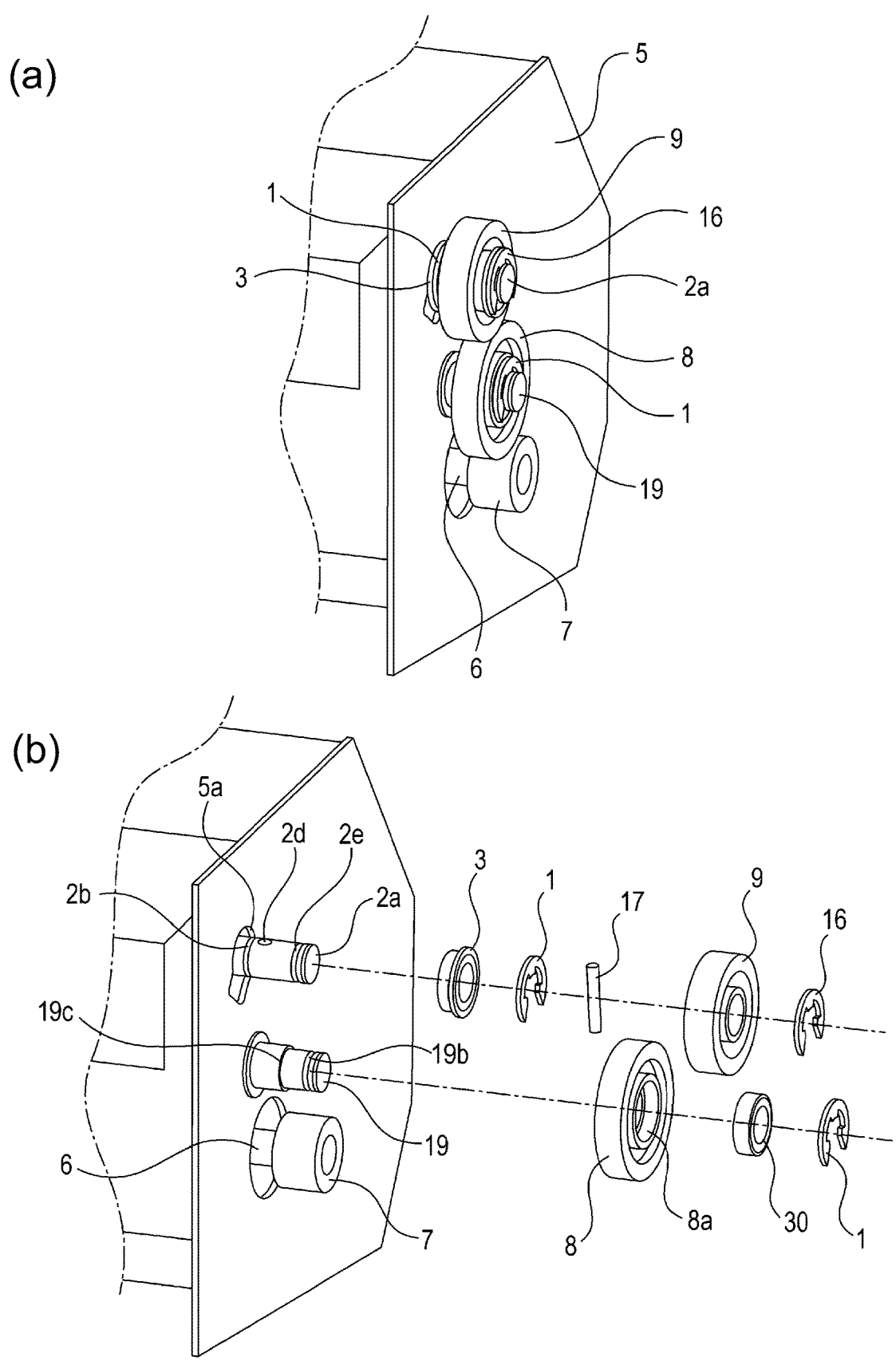
FIG. 2 is a perspective view and an exploded perspective view of an end receiving portion at one end portion of a shaft.
Figure 3:
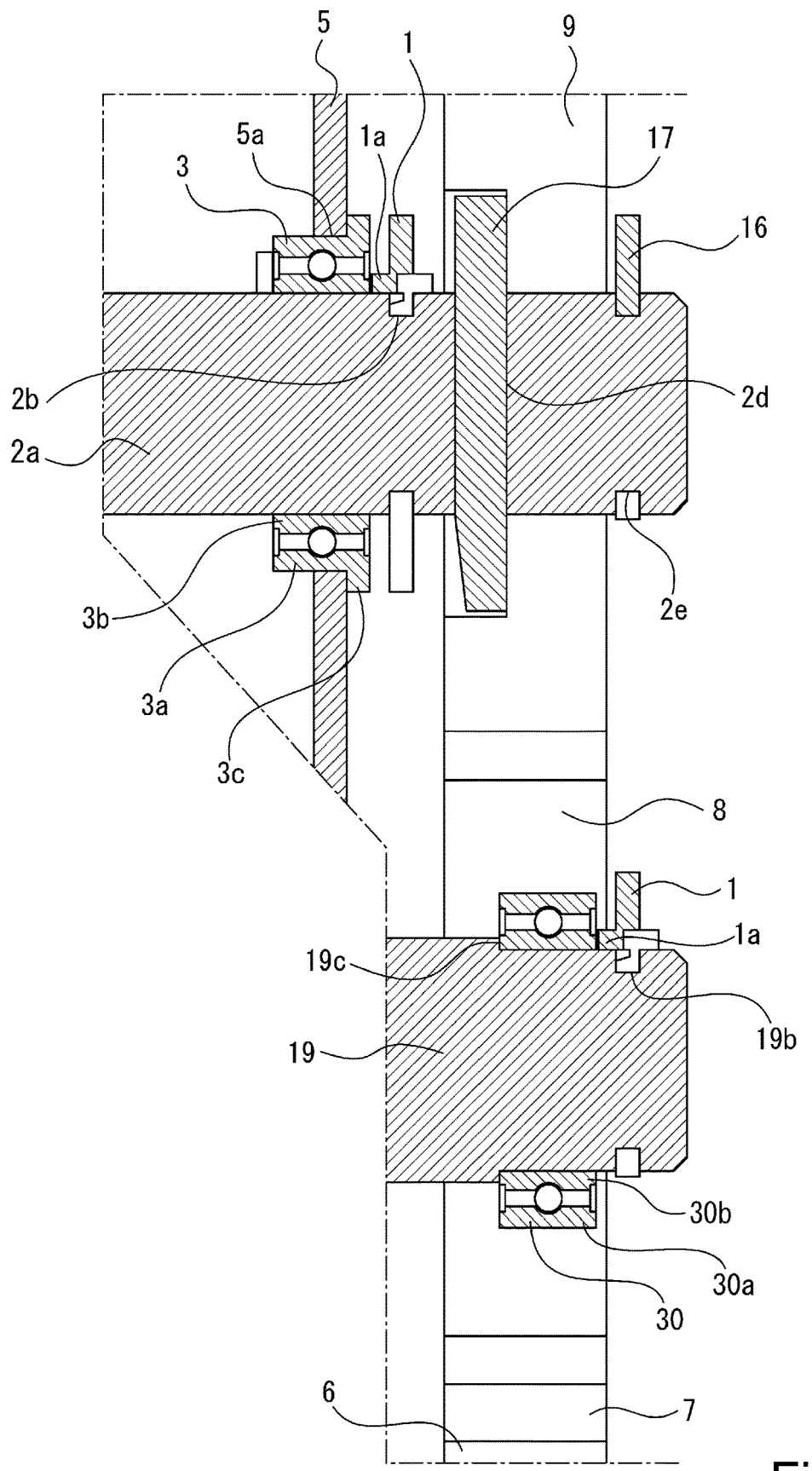
FIG. 3 is a cross-sectional view of an end receiving portion at one end portion of the shaft.
Figure 4:
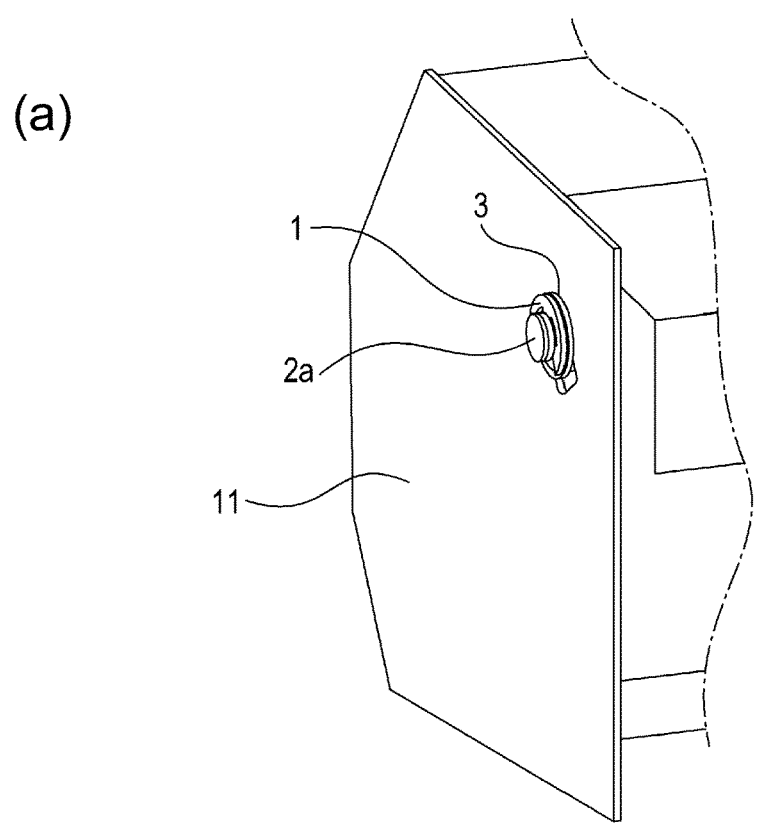
FIG. 4 is a perspective view and an exploded perspective view of an end receiving portion at the other side of the shaft.
Figure 4:
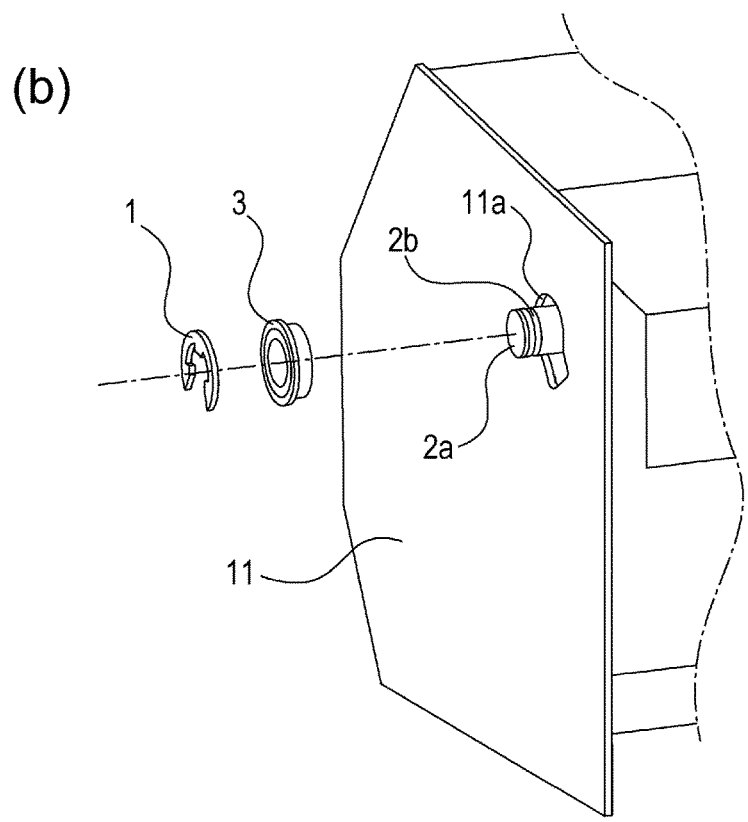
Figure 5:
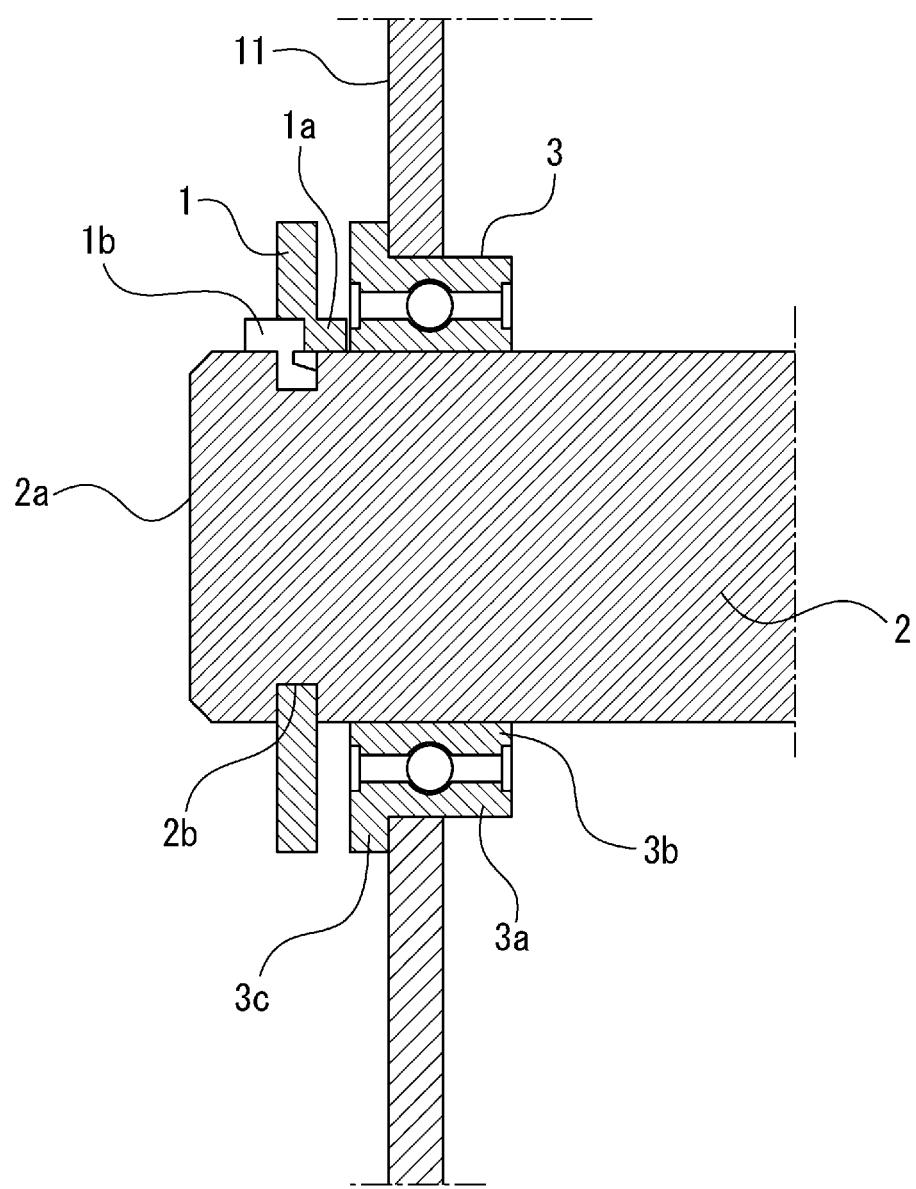
FIG. 5 is a sectional view of an end receiving portion at the other end of the shaft.

FIGS. 2 and 3 are illustrations showing the structure of the end receiving portion on one side of the shaft 2a. Here, FIG. 2(a) is a perspective view, FIG. 2(b) is an exploded perspective view, and FIG. 3 is a sectional view. FIGS. 4 and 5 are illustrations showing the structure of the other end receiving portion of the shaft 2a. Here, FIG. 4(a) is a perspective view, FIG. 4(b) is an exploded perspective view, and FIG. 5 is a sectional view.

As shown in FIGS. 2 to 5, the shaft 2a is made of metal such as iron, and opposite end portions are supported by side plates 5 and 11 of the image forming apparatus A by way of respective bearings 3.

The bearing 3 includes an outer ring 3a and an inner ring 3b, and a flange 3c is formed at one end of the outer ring 3a. In the bearing 3, the inner ring 3b is fixed to the shaft 2a, the outer ring 3a rotatably supports the inner ring 3b, and the inner ring 3b and the outer ring 3a are structured to be rotatable relative to each other. In the bearing 3 of this embodiment, the outer ring 3a and the inner ring 3b have the same width as measured in the thrust direction. The bearing 3 is fixed to the side plates 5 and 11 by fitting the flange portions 3c into a round holes 5a and 11a formed in the side plates 5 and 11 from the outside thus to engage the flange portions 3c with the side plates 5 and 11.

At each end of the shaft 2a, a retaining ring groove 2b having a diameter reduced by one step on the circumference thereof, and a retaining ring 1 for the shaft is fitted and mounted in the retaining ring groove 2b. The shaft retaining ring 1 restricts the position of the bearing 3 in the thrust direction. In other words, the shaft retaining ring 1 positions the bearing 3 in the thrust direction of the shaft 2a, and suppresses disengagement and displacement thereof in the thrust direction.

A gear 9 is mounted on one end of the shaft 2a. A parallel pin 17 is provided, in the neighborhood of the gear 9, through a hole 2d formed in the shaft 2a. On the opposite side of the gear 9 from the side where the parallel pins 17 are provided, an E-ring 16 is fitted in an E-ring groove 2e formed in the shaft 2a. The position of the gear 9 in the thrust direction is restricted by the E-ring 16 and the parallel pin 17.

An idler shaft 19 which is a stepped shaft is fixed to the side plate 5 by caulking. An idler gear 8 (rotary member) is mounted on the idler shaft 19 by way of a bearing 30 having an outer ring 30a and an inner ring 30b. In the bearing 30, the inner ring 30b fixes the idler shaft 19, the outer ring 30a rotatably supports the inner ring 30b, and the inner ring 30b and the outer ring 30a are structured to be rotatable relative to each other. The bearing 30 has an outer ring 30a and an inner ring 30b having the same width in the thrust direction is fitted into a bearing insertion hole 8a formed in the idler gear 8, and is press-fitted into the idler shaft 19. The idler shaft 19 is a rotation shaft of the idler gear 8.

At the end of the idler shaft 19, a retaining ring groove 19b having a diameter reduced by one step and formed around the circumference thereof, and the retaining ring 1 for the shaft is fitted and mounted in the retaining ring groove 19b. The position of the bearing 30 in the thrust direction is restricted by the shaft retaining ring 1 and a step 19c formed on the idler shaft 19. That is, the shaft retaining ring 1 positions the bearing 30 in the thrust direction of the shaft 19, and suppresses disengagement and displacement thereof in the thrust direction.

A motor 6 is mounted on the side plate 5 in the neighborhood of the idler shaft 19. A pinion gear 7 is attached to a shaft of the motor 6. The pinion gear 7 is connected to a gear 9 by way of an idler gear 8. Therefore, when the motor 6 is driven, the rotational driving force of the motor 6 is inputted to the gear 9 by way of the pinion gear 7 and the idler gear 8. That is, the idler gear 8 transmits the rotational driving force of the motor 6 to the shaft 2a by way of the gear 9. By this operation, the shaft 2a can be driven.

<Shaft Retaining Ring>

Next, the structure of the shaft retaining ring 1 mounted to the shaft 2a or the idler shaft 19 will be described in detail. In this embodiment, the shaft retaining ring 1 is made of metal, and is formed by pressing a sheet metal or the like.

Figure 6:
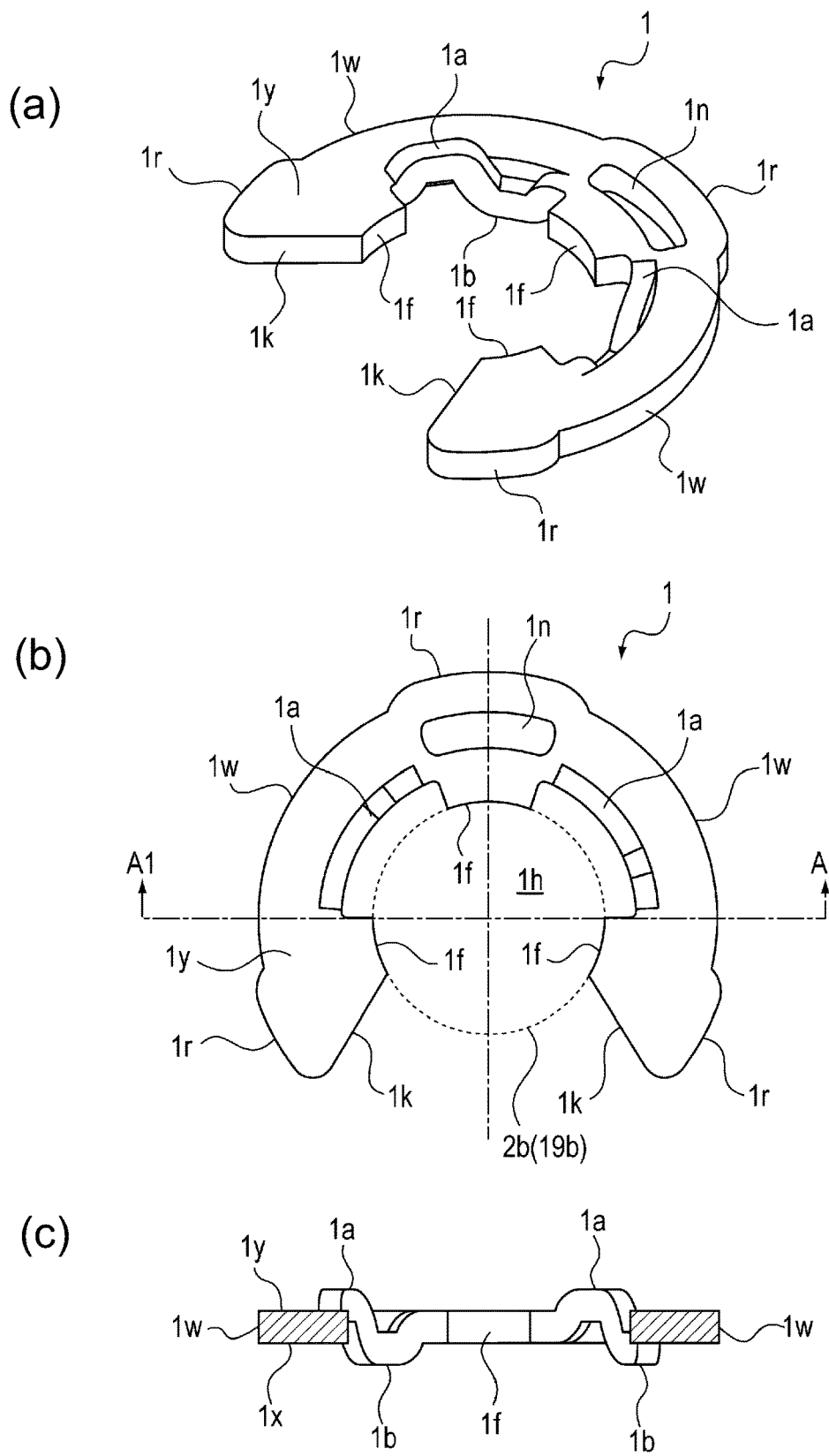
FIG. 6 is a perspective view, a plan view, and a cross-sectional view of a shaft retaining ring according to the first embodiment.

FIG. 6 is an illustration showing the structure of the retaining ring 1 for the shaft. Here, FIG. 6(a) is a perspective view of the retaining ring 1 for the shaft, FIG. 6(a) is a plan view thereof, and FIG. 6(c) is a cross-sectional view (cross section taken along line A1-A1).

As shown in FIG. 6, the shaft retaining ring 1 is formed with a fitting hole 1h to be fitted around the shaft 2 a or the idler shaft 19. Around the fitting hole 1h, three holding claws if for holding the shaft 2a or the idler shaft 19 are provided concentrically. The diameter of the concentric circle corresponds to the diameter of the retaining ring groove 2b or 19b. In addition, a guide slope 1k for guiding the shaft 2a or the idler shaft 19 to the fitting hole 1h and the holding claws if is formed in the shaft retaining ring 1, with an outwardly expanding R-shaped end portion.

The shaft retaining ring 1 is provided with a through hole 1n penetrating in the thrust direction of the shaft 2a. The assembling worker can easily pull out and remove the shaft retaining ring 1 from the shaft 2a or the idler shaft 19 by hooking a tool such as a screwdriver or tweezers into the through hole 1n.

In addition, the shaft retaining ring 1 is provided with a outer peripheral projection 1r, which is the outermost diameter portion, at each of three positions. The outer peripheral projection 1r has the same size as a general standard E-ring. Therefore, the assembling worker can mount and dismount the shaft retaining ring 1 using a dispenser or an E-ring mounting tool without using a special tool.

A recess 1w providing a smaller diameter of the ring than the outer peripheral projection 1r is formed between adjacent outer peripheral projections 1r. By adjusting the diameter (depth) of the recess 1w, a elasticity of the shaft retaining ring 1 in a radial direction of the shaft can be adjusted.

Here, in a flat portion 1y of the shaft retaining ring 1, a first protrusion 1a (protrusion) which protrudes in the thrust direction of the shaft 2a on which the shaft retaining ring 1 is mounted is formed. A plurality of the first protrusions 1a are provided in the rotational direction of the shaft 2a (rotational direction of the bearing 3 supporting the shaft 2a).

A second protrusion 1b (which protrudes in a direction opposite to the direction in which the first protrusion 1a protrudes) is formed on a flat portion 1x opposite to the flat portion 1y on which the first protrusion 1a of the retaining ring 1 is formed. The first protrusion 1a and the second protrusion 1b are positioned adjacent to each other, and these are connected with each other. By this arrangement, the first protrusion 1a and the second protrusion 1b provides a corrugated shape. Further, the widths of the first protrusion 1a and the second protrusion 1b measured in the thrust direction are the same.

Here, as shown in FIGS. 3 and 5, the first protrusion 1a of the retaining ring 1 for the shaft is arranged so as not to contact the outer rings 3a or 30a of the bearings 3 or 30 and to contact the inner rings 3b or 30b. That is, in order to accomplish the structure in which the first protrusion 1a is out of contact with the outer rings 3a, 30a of the bearings 3, 30 supporting the shaft 2a or the idler shaft 19, and is in contact with the inner rings 3b, 30b, the first protrusion 1a protrudes in the thrust direction of the shafts 2a, 19 beyond the surface of the flat portion 1y opposed to the outer rings 3a, 30a.

With this structure, the shaft retaining ring 1 mounted to the shaft 2a contacts with the inner ring 3b of the bearing 3 that rotates together with the shaft retaining ring 1 by the rotation of the shaft 2a, whereas it does not contact with the outer ring 3a which does not rotate. Similarly, the shaft retaining ring 1 mounted to the idler gear 8 contacts with the inner ring 30b of the bearing 30 which is not rotating when the motor 6 is driven, whereas it does not contact with the rotating outer ring 30a.

By using the shaft retaining ring 1, the shaft retaining ring 1 and the outer rings of the bearings 3 or 30 can be kept out of contact with each other. For this reason, it is possible to prevent the outer rings 3a, 30a of the bearings 3, 30 and the retaining ring 1 from rubbing against each other, thereby preventing production of abnormal noise, rubbing wear, and rubbing powder.

Figure 7:
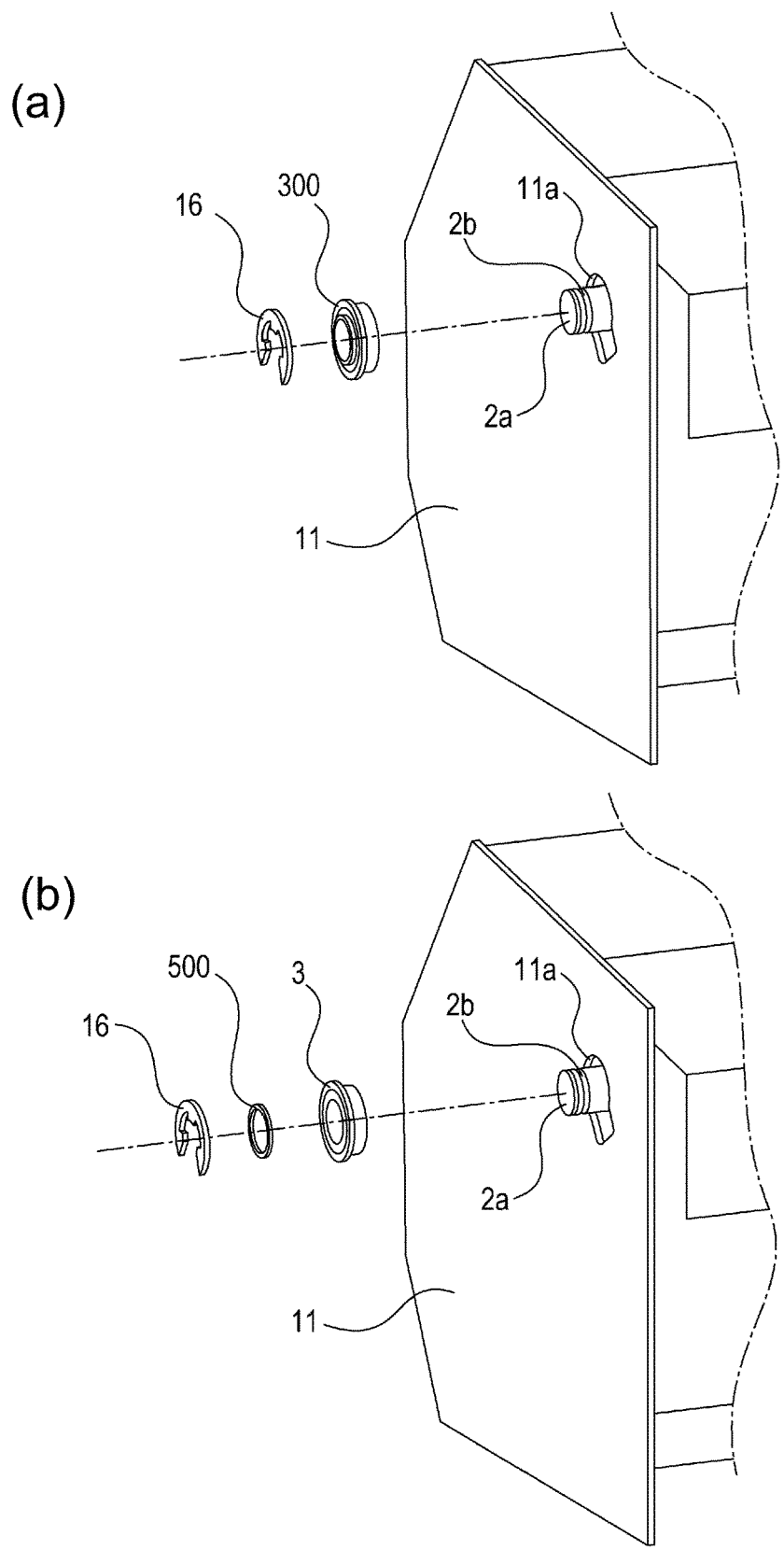
FIG. 7 is an exploded perspective view of an end receiving portion of a conventional shaft.

Also, as shown in FIG. 7(a), also by using the wide inner ring bearing 300 and the E ring 16, instead of the standard bearing 3 having the same outer ring 3a and the inner ring 3b widths, the outer ring 300a of the bearing 300 can be made out of contact with the E ring. However, such wide inner ring bearings are more expensive than the standard bearings. On the other hand, according to the structure of this embodiment, the shaft retaining ring 1 and the outer rings 3a, 30a of the bearings 3, 30 can be kept out of contact with each other, with an inexpensive structure, even using standard bearings. It is preferable that the amount of protrusion of the first protrusion 1a of the retaining ring 1 for the shaft from the flat portion 1y is equal to the amount of protrusion of the inner ring 300b of the bearing 300 from the outer ring 300a.

Further, as shown in FIG. 7(b), by providing a spacer 500 between the bearing 3 and the E-ring 16 for regulating the position of the bearing 3 in the thrust direction, the position of the bearing 3 is restricted so that the E-ring and the outer ring 3a of the bearing 3 can be made out of contact with each other. However, in the case that the spacer 500 is used, there is a likelihood that the number of parts increases and therefore the manufacturing cost increases. On the other hand, according to the structure of this embodiment, the number of components can be reduced, and the outer ring 3a, 30a of the bearing 3, 30 can be kept out of contact with each other, with an inexpensive structure. In addition, the step of mounting the spacer 500 during the assembly or maintenance is unnecessary, and therefore, operativity can be improved.

In addition, by selecting the width of the first protrusion 1a and the second protrusion 1b in the thrust direction to be the same, a distance between the shaft retaining ring 1 and the bearing 3 can be made constant, even if the shaft retaining ring 1 is mounted on the shaft 2a in either direction.

Second Embodiment

Next, a second embodiment of an image forming apparatus including a shaft retaining ring according to the present invention will be described with reference to the drawings. The portions which are the same as those in the first embodiment will be denoted by the same drawings and the same reference numerals, and the description thereof will be omitted.

Figure 8:
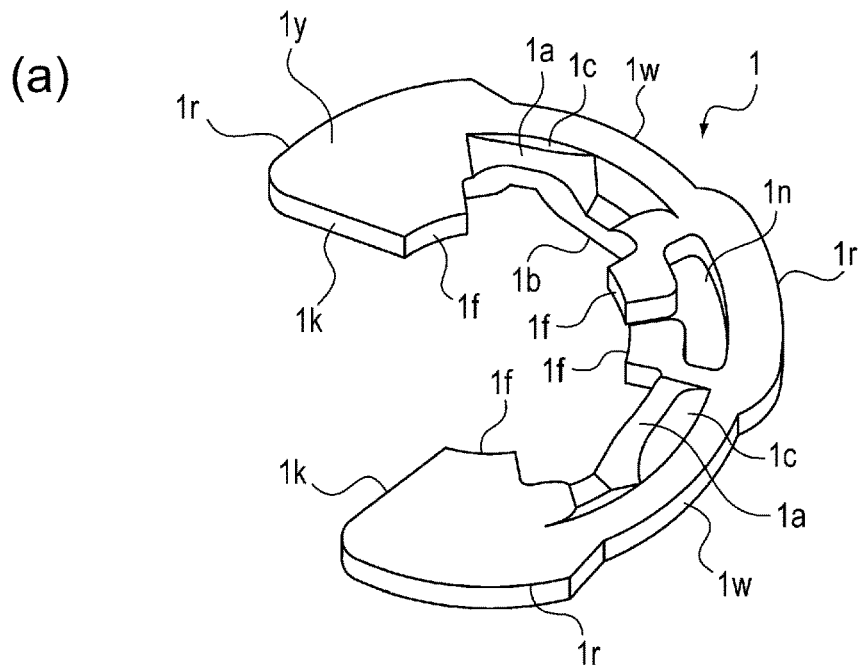
FIG. 8 is a perspective view, a plan view, and a cross-sectional view of a shaft retaining ring according to a second embodiment.
Figure 8:
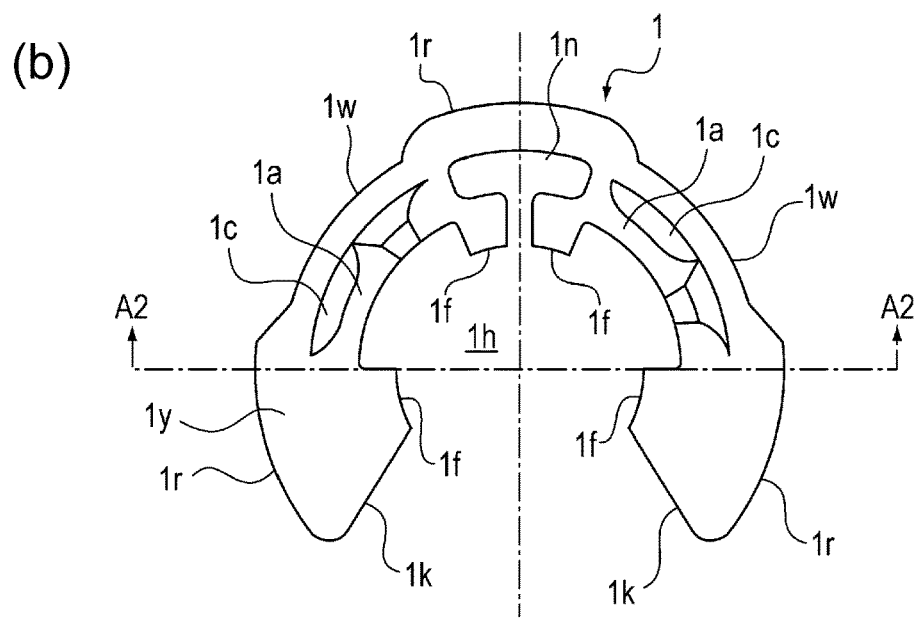
Figure 8:
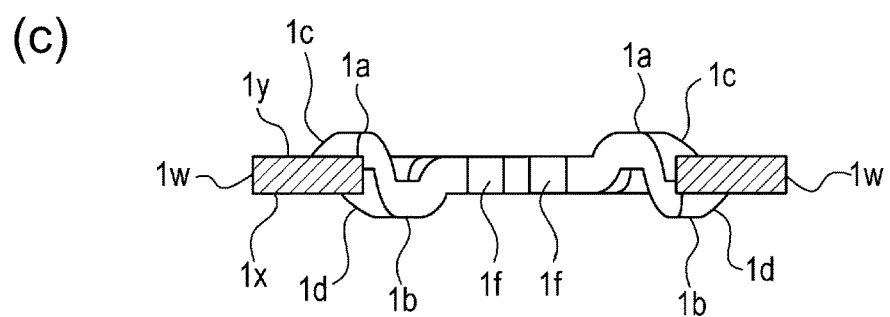

FIG. 8 is a view illustrating a structure of a shaft retaining ring 1 according to this embodiment. Here, FIG. 8(a) is a perspective view of the retaining ring 1 for a shaft, FIG. 8(b) is a plan view, and FIG. 8(c) is a cross-sectional view (taken along A2-A2).

As shown in FIG. 8, the retaining ring 1 for the shaft according to this embodiment differs from the structure of the first embodiment in that a slit 1z is formed in a holding claw if to communicate the fitting hole 1h with the through hole 1n. By this structure, the outer peripheral projection 1r where the through-hole 1n is formed constitutes a narrow portion and is easily bent, thus making it difficult to open the recess 1w to optimize the fastening force and the insertion/extraction force of the shaft retaining ring 1 with respect to the shaft.

Further, a surface connecting a flat portion 1y of the shaft retaining ring 1 (surface facing the inner rings 3b and 30b of the bearings 3 or 30) and the protrusion 1a constitutes an arc-shaped inclined surface 1c which is inclined from the tip of the first protrusion 1a toward the outer edge side of retaining ring 1.

Also, the surface connecting the flat portion 1x of the shaft retaining ring 1 (a surface opposite to the surface facing the inner rings 3b, 30b of the bearings 3, 30) and a second protrusion 1b constitutes an arc-shaped inclined surface 1d inclined from the tip of the second protrusion 1b toward the outer edge side of the shaft retaining ring 1.

By providing the inclined surfaces 1c and 1d in this way, even if a strong thrust direction load is applied to the shaft 2a or the idler shaft 19 when using, for example, a helical gear, a reinforcement is provided by the inclined surfaces, and therefore, the deformation in the thrust direction of the shaft retaining ring 1 (particularly, the recess 1w) can be suppressed.

Third Embodiment

Next, a third embodiment of an image forming apparatus provided with a shaft retaining ring according to the present invention will be described with reference to the drawings. The same portions as those in the first embodiment and the second embodiment will be denoted by the same drawings and the same reference numerals, and the description thereof will be omitted.

Figure 9:
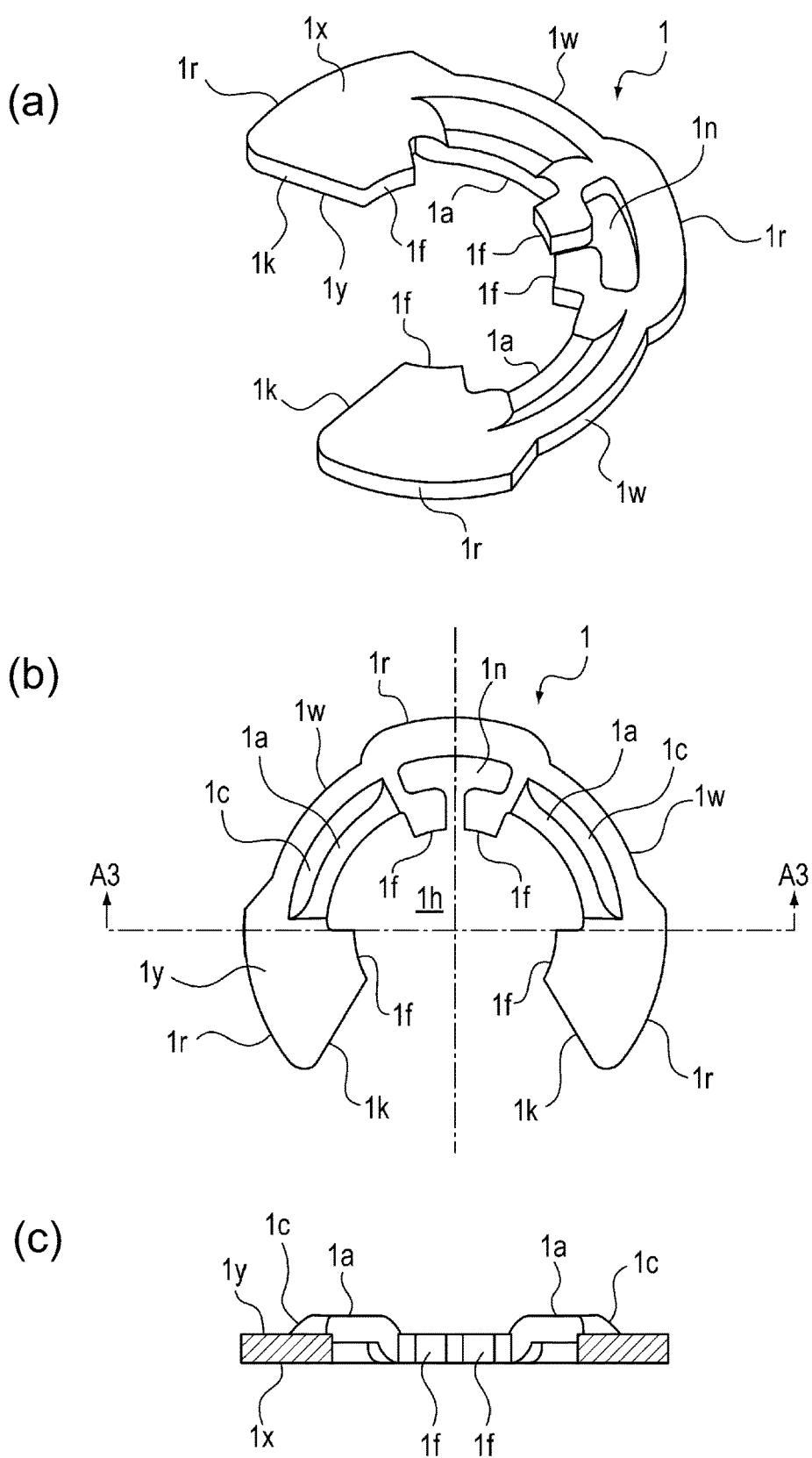
FIG. 9 is a perspective view, a plan view, and a sectional view of a shaft retaining ring according to a third embodiment.

FIG. 9 is a view illustrating a structure of a shaft retaining ring 1 according to this embodiment. Here, FIG. 9(a) is a perspective view of the retaining ring 1 for a shaft, FIG. 9(b) is a plan view thereof, and FIG. 9(c) is a cross-sectional view (taken along a line A3-A3).

As shown in FIG. 9, the retaining ring 1 for a shaft according to this embodiment has a structure in which only the first protrusion 1a is provided without providing the second protrusion 1b as compared with the structure of the second embodiment. That is, the shaft retaining ring 1 according to this embodiment has a structure in which only the first protrusion 1a protrudes in the thrust direction with respect to the plane portion 1y.

By this structure, in the case of forming the first protrusion 1a of the retaining ring 1 for shafts by the press work, as compared with the structure of the second Embodiment in which both sides of the flat part 1y protrude, the area contacting the inner rings 3b or 30b in the first protrusion 1a can be increased. For this reason, even when a load in the thrust direction is applied to the shaft retaining ring 1, the tilting and the inclination of the shaft retaining ring 1 can be suppressed, so that the attitude can be stabilized. With the structure of this embodiment, the area of the surface in contact with the inner rings 3b or 30b in the first protrusion 1a is 3 to 6 times that in the structure of the second embodiment, and is increased to approximately half in the circumferential direction.

Fourth Embodiment

Next, a fourth embodiment of an image forming apparatus including a shaft retaining ring according to the present invention will be described with reference to the drawings. The same portions as those in the first to third embodiments will be denoted by the same drawings and the same reference numerals, and the description thereof will be omitted.

Figure 10:
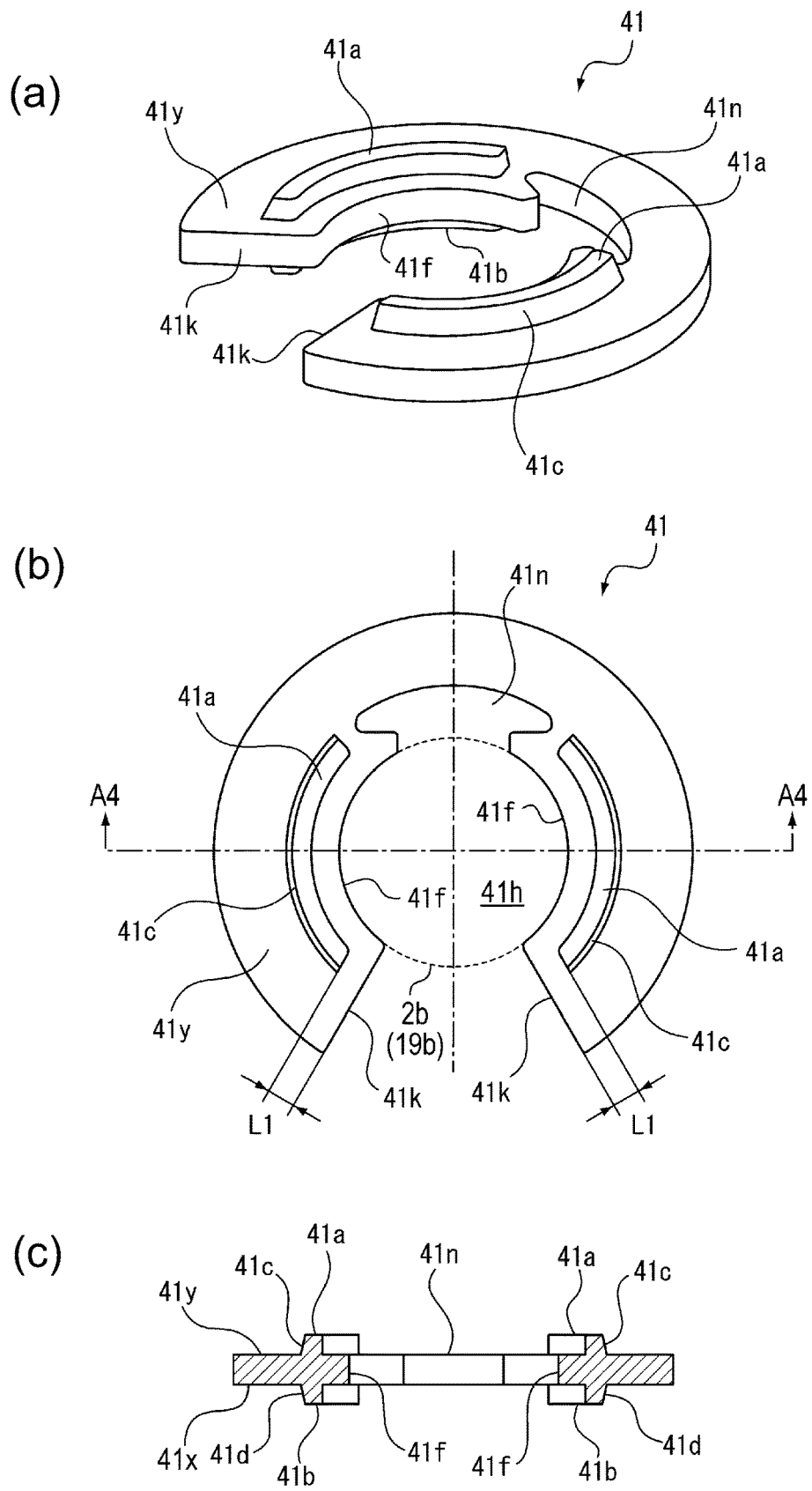
FIG. 10 is a perspective view, a plan view, and a cross-sectional view of a shaft retaining ring according to a fourth embodiment.

FIG. 10 is a view illustrating a structure of the shaft retaining ring 41 according to this embodiment. Here, FIG. 10(a) is a perspective view of the retaining ring 41 for the shaft, FIG. 10(b) is a plan view, and FIG. 10(c) is a cross-sectional view (taken along a line A4-A4). The shaft retaining ring 41 according to this embodiment is different from the metal shaft retaining ring 1 of the first to third embodiments in that it is made of a plastic resin, and is formed by injection molding or the like.

As shown in FIG. 10, a fitting hole 41h is formed in the shaft retaining ring 41 so as to be fitted around and mounted on the shaft 2a or the idler shaft 19. Around the fitting hole 41h, two holding claws 41f for holding the shaft 2a or the idler shaft 19 are provided on a concentric circle. The diameter of the concentric circle corresponds to (equal to or slightly smaller than) the diameter of the retaining ring grooves 2b or 19b. A guide slope 41k for guiding the shaft 2a or the idler shaft 19 to the fitting hole 41h and the holding claw 41f is formed on the shaft retaining ring 41 with an R-shape at the free end to expand outward.

The shaft retaining ring 41 is provided with a through hole 41n penetrating in the thrust direction of the shaft 2a. The through hole 41n communicates with the fitting hole 41h in which the shaft 2a or the idler shaft 19 fit. The assembling operator can easily pull out and remove the shaft retaining ring 41 from the shaft 2a or the idler shaft 19 by hooking a tool such as a screwdriver or tweezers into the through hole 41n. The elasticity of the shaft retaining ring 41 can be adjusted by adjusting the size of the through hole 41n.

The outermost diameter portion of the shaft retaining ring 41 has the same dimensions as a general standard E-ring. Therefore, the assembling operator can perform the mounting/dismounting of the shaft retaining ring 41 using a dispenser or an E-ring mounting tool without using a special tool.

Here, a first protrusion 41a protruding in the thrust direction of the shaft 2a to which the shaft retaining ring 41 is mounted is formed in the flat portion 41y of the shaft retaining ring 41. A plurality of the first protrusions 41a are provided along the rotational direction of the shaft 2a (the rotational direction of the bearing 3 supporting the shaft 2a).

A second protrusion 41b protruding in a direction opposite to a direction in which the first protrusion 41a protrudes is formed on a flat portion 41x opposite to the flat portion 41y on which the first protrusion 41a of the retaining ring 41 is formed. The first protrusion 1a and the second protrusion 1b are arranged at corresponding positions, and the widths of the first protrusion 1a and the second protrusion 1b in the thrust direction is the same.

Figure 11:
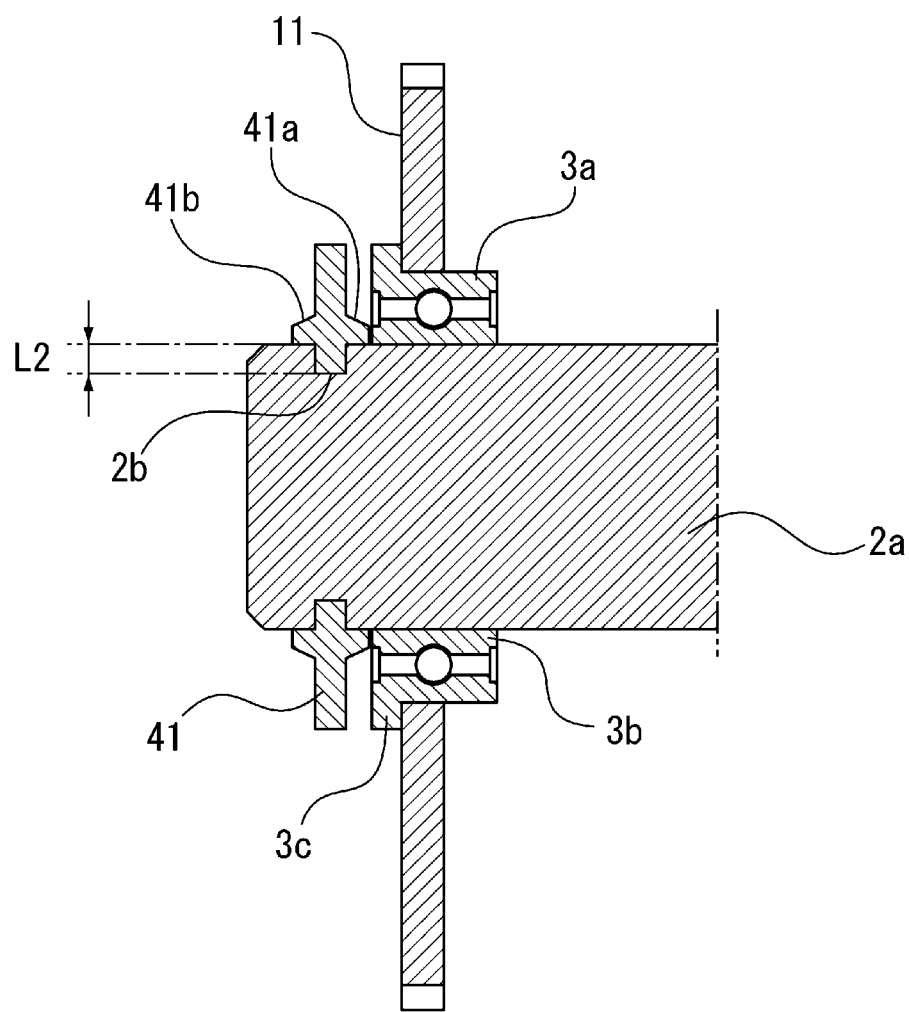
FIG. 11 is a sectional view of an end receiving portion on the other side of the shaft.

FIG. 11 is a cross-sectional view of an end receiving portion of the shaft 2a when the shaft retaining ring 41 is fitted and mounted in a retaining ring groove 2b formed at an end of the shaft 2a. FIG. 11 shows a view in which the shaft retaining ring 1 according to the first embodiment is replaced with the shaft retaining ring 41 according to this embodiment in FIG. 5.

As shown in FIG. 11, the first protrusion 41a of the shaft retaining ring 41 is disposed without contact with the outer rings 3a, 30a of the bearings 3, 30 and in contact with the inner rings 3b, 30b. That is, the first protrusion 41a is out of contact with the outer rings 3a, 30a of the bearings 3, 30 supporting the shaft 2a or the idler shaft 19, and is in contact with the inner rings 3b, 30b, by protruding in the thrust direction from the surface opposing the inner ring 3b, 30b of the flat surface portion 41y.

By this structure, the shaft retaining ring 41 mounted to the shaft 2a contacts with the inner ring 3b of the bearing 3 which rotates together with the shaft retaining ring 41 due to the rotation of the shaft 2a, but does not contact the outer ring 3a which does not rotate. Similarly, when the shaft retaining ring 1 according to the first embodiment is replaced with the shaft retaining ring 41 according to this embodiment in FIG. 3, the shaft retaining ring 41 mounted to the idler gear 8, in the case of the motor 6 rotating, contacts with the inner ring 30b of the bearing 30 which is not rotating, while it does not contact with the outer ring 30a which is rotating.

By using the shaft retaining ring 41 in this manner, the shaft retaining ring 41 and the outer rings of the bearings 3, 30 can be kept out of contact from each other. Therefore, it is possible to prevent the outer rings 3a, 30a of the bearings 3, 30 and the shaft retaining ring 41 from rubbing relative to each other, thereby preventing production of abnormal noise, rubbing wear, and rubbing powder.

In addition, as described above, even if the wide inner ring bearing and the E-ring are used, the E-ring and the outer ring of the bearing can be kept out of contact, but the wide inner ring bearing is more expensive than the standard bearing. On the other hand, according to the structure of this embodiment, the shaft retaining ring 41 and the outer rings 3a, 30a of the bearings 3, 30 can be kept out of contact from each other, with an inexpensive structure using standard bearings. It is preferable that the amount of protrusion of the first protrusion 41a of the shaft retaining ring 41 from the flat portion 41y is equivalent to the amount of protrusion of the inner ring from the outer ring in the wide inner ring bearing.

Further, as described above, by providing a spacer between the bearing 3 and the E-ring that restricts the position of the bearing 3 in the thrust direction, the position of the bearing 3 is restricted, and the E-ring and the outer ring 3a of the bearing 3 can be out of contact from each other. However, when a spacer is used, there is a likelihood that the number of parts increases and therefore the manufacturing cost increases. On the other hand, according to the structure of this embodiment, the number of parts can be reduced, and the shaft retaining ring 41 and the outer rings 3a, 30a of the bearings 3, 30 can be kept out of contact from each other, with an inexpensive structure. In addition, the step of mounting the spacer during product assembly or maintenance is unnecessary, so that the operativity can be improved.

Also, by setting the width of the first protrusion 41a and the second protrusion 41b in the thrust direction to be the same width, the shaft retaining ring 41 can be mounted on the shaft 2a or the idler shaft 19 from any direction, with the distance between the retaining ring 41 and the bearings 3 or 30 being constant.

Further, the surface connecting the flat portion 41y of the shaft retaining ring 41 (surface facing the inner rings 3b and 30b of the bearings 3 and 30) and the first protrusion 41a constitutes an arc-shaped inclined surface 41c which is inclined from the free end of the first protrusion 41a toward the outer edge of the ring 41 is formed.

The surface connecting the flat portion 41x of the shaft retaining ring 41 (the surface opposite to the surface facing the inner rings 3b or 30b of the bearings 3 or 30) and the second protrusion 41b is connected to the tip of the second protrusion 41b.

By forming the inclined surfaces 41c and 41d in this way, even if a strong thrust direction load is applied to the shaft 2a or the idler shaft 19, when using a helical gear, for example, a reinforcement is provided by the inclined surfaces, so that deformation of the shaft retaining ring 41 in the thrust direction can be suppressed.

The gap dimension L1 (FIG. 10B) between the guide slope 1k and the end of the first protrusion 41a on the guide slope 1k side is preferably equal to or slightly larger than the step size L2 between the shaft diameter of the shaft 2a and the retaining ring groove 2b (FIG. 11). This makes it easier to fit the shaft retaining ring 41 around the shaft 2a or the idler shaft 19.

Fifth Embodiment

Next, a fifth embodiment of an image forming apparatus provided with a shaft retaining ring according to the present invention will be described with reference to the drawings. The portions that are the same as those in the first to fourth embodiments will be denoted by the same drawings and the same reference numerals, and description thereof will be omitted.

Figure 12:
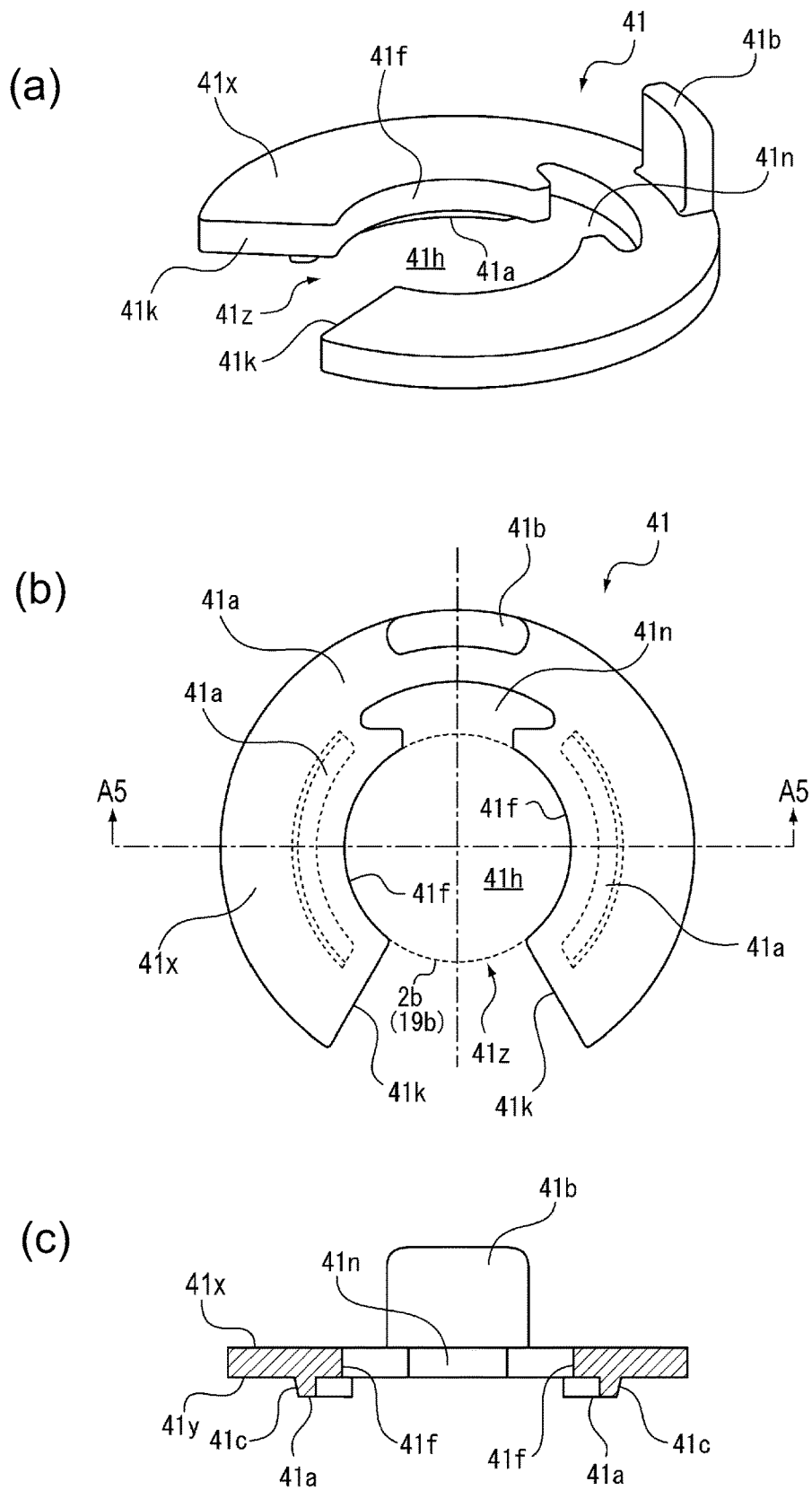
FIG. 12 is a perspective view, a plan view, and a sectional view of a shaft retaining ring according to a fifth embodiment.

FIG. 12 is a view illustrating a structure of a shaft retaining ring 41 according to this embodiment. Here, FIG. 12(a) is a perspective view of the shaft retaining ring 41, FIG. 12(b) is a plan view, and FIG. 12(c) is a sectional view (taken along a line A5-A5).

As shown in FIG. 12, the retaining ring 41 for a shaft according to this embodiment differs from the structure of the fourth embodiment in that the width of the second protrusion 41b in the thrust direction is larger than that of the first protrusion 41a.

With such a structure, the retaining ring 41 can be removed from the shaft 2a or the idler shaft 19, by pinching and pulling out the second retaining portion 41b with a finger, without pushing the guide inclined surface 41k outward, and without inserting a tool such as a screwdriver or a pin into the through-hole 41n. That is, in this embodiment, the second protrusion 41b has a function of a grip portion to be gripped when the shaft retaining ring 41 is pulled out.

Further, the second protrusion 41b is preferably disposed at a position opposite to the opening 41z for fitting the shaft 2a or the idler shaft 19 with respect to the center of the fitting hole 41h. This makes it easier to grip the second protrusion 41b and pull out the retaining ring 41 for the shaft.

The width of the second protrusion 41b in the thrust direction is preferably larger than the gap between the flat portion 41y of the retaining ring 41 for the shaft on which the first protrusion 41a is formed and the side plates 5 and 11. Thus, when the shaft retaining ring 41 is mounted on the shaft 2a such that the second protrusion 41b faces the bearings 3 or 30, the second protrusion 41b interferes with the side plates 5 and 11, so that the shaft retaining ring 41 can be prevented from being erroneously mounted.

Sixth Embodiment

Next, a sixth embodiment of the image forming apparatus including a shaft retaining ring according to the present invention will be described with reference to the drawings. The portions which are the same as those in the first to fourth embodiments will be denoted by the same drawings and the same reference numerals, and the description thereof will be omitted.

Figure 13:
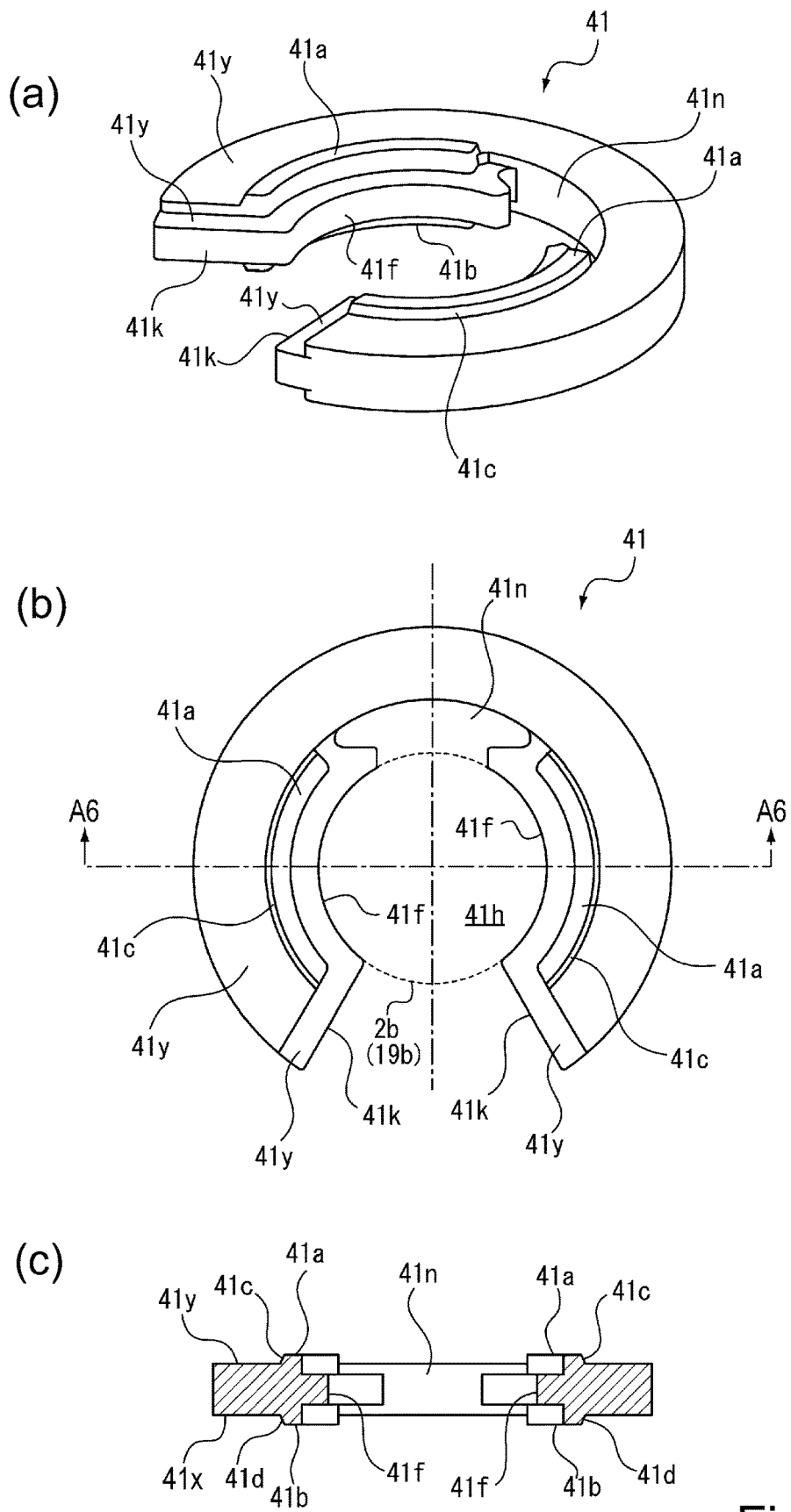
FIG. 13 is a perspective view, a plan view, and a sectional view of a shaft retaining ring according to a sixth embodiment.

FIG. 13 is a view showing a structure of the shaft retaining ring 41 according to this embodiment. Here, FIG. 13(a) is a perspective view of the retaining ring 41 for a shaft, FIG. 13(b) is a plan view, and FIG. 13(c) is a cross-sectional view (taken along a line A6-A6).

As shown in FIG. 13, the retaining ring 41 for a shaft according to this embodiment is different from the fourth embodiment in the width of the flat portion 41y in the thrust direction on the outer edge side beyond the first protrusion 41a being larger wider than the width of the inner edge side beyond the first protrusion 41a.

With this structure, even when a strong thrust direction load is applied to the shaft 2a or the idler shaft 19, and the thrust direction load is applied to the shaft retaining ring 41, the deformation of the shaft retaining ring 41 can be suppressed.

Seventh Embodiment

Next, a seventh embodiment of an image forming apparatus including a shaft retaining ring according to the present invention will be described with reference to the drawings. The portions which are the same as those in the first to sixth embodiments will be denoted by the same drawings and the same reference numerals, and description thereof will be omitted.

Figure 14:
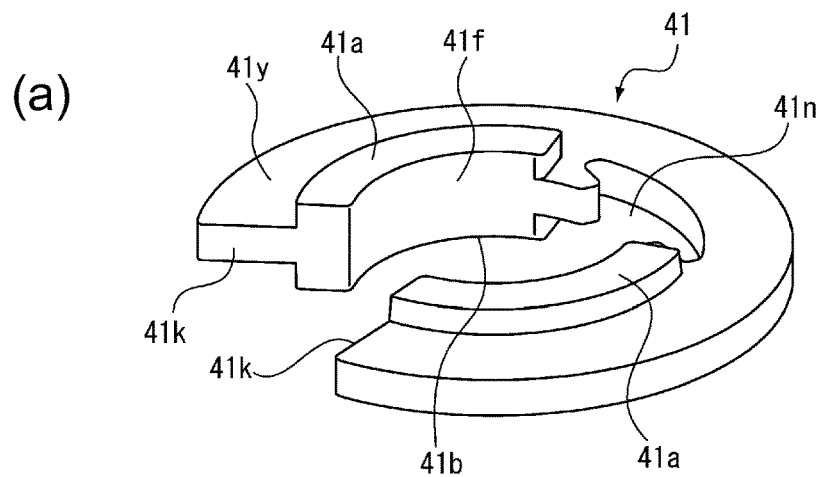
FIG. 14 is a perspective view, a plan view, and a sectional view of a shaft retaining ring according to a seventh embodiment.
Figure 14:
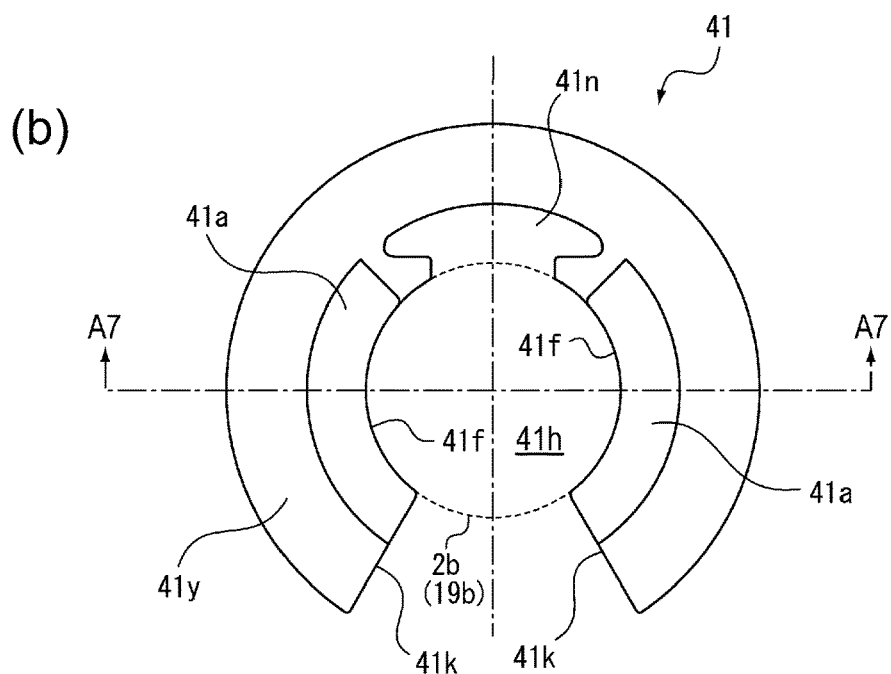
Figure 14:
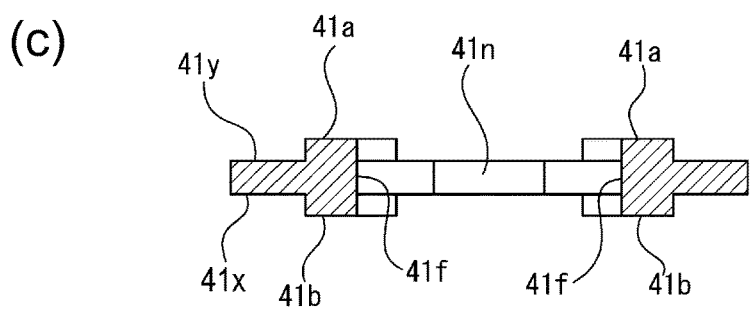

FIG. 14 is a view illustrating the structure of the shaft retaining ring 41 according to this embodiment. FIG. 14(a) is a perspective view of the shaft retaining ring 41, FIG. 14(b) is a plan view, and FIG. 14(c) is a cross-sectional view (taken along a line A7-A7).

As shown in FIG. 14, the shaft retaining ring 41 according to this embodiment is different from the structure of the fourth embodiment in that the inner peripheral surface of the first protrusion 41a, the inner peripheral surface of the second protrusion 41b, the inner peripheral surface of the claw 41f are flush with each other. That is, in the retaining ring 41 for the shaft, the first protrusion 41a and the second protrusion 41b are integrated with the holding claw 41f, and the thickness of the holding claw 41f is increased to enhance the strength. In the first to sixth embodiments, the widths of the retaining ring groove 2b and the retaining ring groove 19b are standardized widths for the E-ring, but in this embodiment, these widths are made larger than the width for the E-ring.

By doing so, even when a strong thrust direction load is applied to the shaft 2a or the idler shaft 19, and the thrust direction load is applied to the shaft retaining ring 41, the deformation of the shaft retaining ring 41 can be suppressed.

INDUSTRIAL APPLICABILITY

According to the present invention, it is possible to provide a shaft retaining ring which can suppress contact between the outer ring of the bearing and the shaft retaining ring with an inexpensive structure.

REFERENCE NUMERALS 1, 41: retaining ring for shaft 1a, 41a: first protrusion (protrusion) 1b, 41b: second protrusion (other protrusion) 1c, 41c: inclined surface 1d, 41d: inclined surface 1h, 41h: Fitting holes (holes that fit into the retaining ring grooves of the shaft) 1n, 41n: Through hole 41z: Openings 2: Transport rollers (rotating members) 2a: Shafts 3, 30: Bearings 3a, 30a: Outer rings 3b, 30b: Inner rings 8: Idler gear (rotating member, gear) 19: Idler shaft (shaft) A: Image forming apparatus S: Sheet (recording medium)

The invention claimed is:

1. A retaining ring to be mounted on a shaft to restrict movement of a bearing with respect to the shaft in a thrust direction, said bearing having an inner ring fixed on the shaft and an outer ring provided at outer side of the inner ring in a radial direction of the shaft and rotatable relative to said inner ring, said retaining ring comprising:
   an inner peripheral portion positioned at an inner periphery of said retaining ring in the radial direction and configured to be fitted around the shaft;
   a communication portion configured to communicate an outer peripheral portion of said retaining ring in the radial direction with said inner peripheral portion in the radial direction and to allow the shaft to pass therethrough such that said inner peripheral portion is fitted around the shaft;
   an opposed portion opposed to said outer ring in a state in which said retaining ring is mounted on the shaft; and
   a protrusion provided inside with respect to said opposed portion in the radial direction of the shaft and protruding in the thrust direction from said opposed portion, and configured to contact the inner ring so that said opposed portion is out of contact from the outer ring,
   wherein said retaining ring comprises a through hole penetrating in the thrust direction which is in communication with said inner peripheral portion, the shaft not passing through said through hole in the state in which said retaining ring is mounted on the shaft,
   wherein a position at which said through hole is disposed is different from a position at which said inner peripheral portion is disposed in the radial direction.

2. A retaining ring according to claim 1, wherein a plurality of such protrusions are arranged in the radial direction of the shaft.

3. A retaining ring according to claim 1, wherein a surface connecting said protrusion and the opposed portion is inclined from a free end portion of said protrusion toward an outer edge side of said retaining ring.

4. A retaining ring according to claim 1, further comprising an additional protrusion protruding from a surface opposite to said opposed portion in a direction opposite to the direction in which the first mentioned protrusion protrudes in the thrust direction.

5. A retaining ring according to claim 4, wherein a plurality of such additional protrusions are arranged in the radial direction of the shaft.

6. A retaining ring according to claim 4, wherein a surface connecting said additional protrusion and the opposed portion is an inclined surface which inclines from a free end portion of said additional protrusion toward an outer edge side of said retaining ring.

7. A retaining ring according to claim 4, wherein said first mentioned protrusion and said additional protrusion have the same width as measured in the thrust direction.

8. A retaining ring according to claim 4, wherein said first mentioned protrusion and said additional protrusion are disposed adjacent to each other and are connected with each other.

9. A retaining ring according to claim 4, wherein a width of said additional protrusion is larger than a width of said first mentioned protrusion, as measured in the thrust direction.

10. A retaining ring according to claim 9, wherein said additional protrusion is placed at a position opposite from said communication portion relative to a center of said inner peripheral portion in the radial direction of the shaft.

11. A retaining ring according to claim 1, wherein said retaining ring is made of a resin material.

12. A retaining ring according to claim 1, wherein said retaining ring is made of metal.

13. A retaining ring according to claim 1, further comprising a second protrusion provided inside with respect to said opposed portion in the radial direction of the shaft and protruding in the thrust direction from said opposed portion, and configured to contact the inner ring so that said opposed portion is out of contact from the outer ring, wherein a position at which said protrusion is disposed is different from a position at which said second protrusion is disposed in a rotational direction in which the shaft rotates, wherein said through hole is positioned between said protrusion and said second protrusion in the rotational direction.

14. An image forming apparatus configured to form an image on a recording material, said apparatus comprising:

a shaft as a rotational axis of a rotatable member provided in said image forming apparatus;

a bearing mounted on said shaft, said bearing having an inner ring fixed on the shaft and an outer ring provided at outer side of the inner ring in a radial direction of the shaft and rotatable relative to said inner ring; and a retaining ring mounted on said shaft and configured to restrict a position of said bearing with respect to said shaft in a thrust direction along said rotational axis, wherein said retaining ring comprises:

an inner peripheral portion positioned at an inner periphery of said retaining ring in the radial direction and configured to be fitted around the shaft;

a communication portion configured to communicate an outer peripheral portion of said retaining ring in the radial direction with said inner peripheral portion in the radial direction and to allow the shaft to pass therethrough such that said inner peripheral portion is fitted around the shaft;

an opposed portion opposed to said outer ring in a state in which said retaining ring is mounted on the shaft; and a protrusion provided inside with respect to said opposed portion in the radial direction of the shaft and protruding in the thrust direction from said opposed portion, and configured to contact the inner ring so that said opposed portion is out of contact from the outer ring, wherein said retaining ring comprises a through hole penetrating in the thrust direction which is in communication with said inner peripheral portion, the shaft not passing through said through hole in the state in which said retaining ring is mounted on the shaft, wherein a position at which said through hole is disposed is different from a position at which said inner peripheral portion is disposed in the radial direction.

15. An apparatus according to claim 14, wherein said rotatable member is a feeding roller for feeding the recording material.

16. An apparatus according to claim 14, wherein said rotatable member is a gear for transmitting a driving force to a feeding roller for feeding the recording material.

* * * * *